US007463216B2

(12) United States Patent
Yamazaki et al.

(10) Patent No.: US 7,463,216 B2
(45) Date of Patent: Dec. 9, 2008

(54) CAPTURED IMAGE OUTPUTTING SYSTEM, DISPLAY CONTROL APPARATUS, LIQUID CRYSTAL PROJECTOR AND DIGITAL CAMERA THAT TRANSMIT IMAGES VIA WIRELESS NETWORK

(75) Inventors: Yasuhiro Yamazaki, Kumagaya (JP); Yasuaki Inoue, Saitama (JP); Yoshinao Hiranuma, Matsudo (JP); Hiroki Miura, Kawaguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 384 days.

(21) Appl. No.: 10/751,897

(22) Filed: Jan. 7, 2004

(65) Prior Publication Data
US 2004/0140971 A1 Jul. 22, 2004

(30) Foreign Application Priority Data
Jan. 14, 2003 (JP) ............................. 2003-006453

(51) Int. Cl.
G09G 5/00 (2006.01)
(52) U.S. Cl. ........................................ 345/2.3; 345/1.1
(58) Field of Classification Search ................ 348/211, 348/207.1, 14.01, 207.99, 333.01, 33.01, 348/157, 660, 647, 231.99, 744; 396/229, 396/56; 345/156, 169, 1.1–3.4, 7, 8, 204; 370/338
See application file for complete search history.

(56) References Cited

U.S. PATENT DOCUMENTS

| 5,963,245 | A | 10/1999 | McDonald |
| 6,335,753 | B1 * | 1/2002 | McDonald ............... 348/14.01 |
| 6,535,243 | B1 * | 3/2003 | Tullis ....................... 348/207.1 |
| 6,830,340 | B2 * | 12/2004 | Olson et al. .................. 353/30 |
| 7,256,820 | B2 * | 8/2007 | Tullis ....................... 348/207.1 |
| 7,274,381 | B2 * | 9/2007 | Mojaver et al. ............. 345/647 |
| 2001/0012051 | A1 | 8/2001 | Hara et al. |
| 2002/0032815 | A1 | 3/2002 | Chiba et al. |

(Continued)

FOREIGN PATENT DOCUMENTS

EP  1 032 201 A3  8/2000

(Continued)

OTHER PUBLICATIONS

Combined Search and Examination Report issued Jul. 13, 2005.

(Continued)

Primary Examiner—Nitin Patel
(74) Attorney, Agent, or Firm—McDermott Will & Emery LLP

(57) ABSTRACT

In a captured image outputting system, an image shot by an image capturing device is, upon shooting the image thereby, instantaneously transmitted to a display control device of a display system via wireless communication. The display system instantaneously projects the received image on a projection screen. The display system is comprised of a display device and a display control device. A liquid crystal projector may serve as the display device whereas an optional device, for use in wireless communication, connected to image input terminals of the liquid crystal projector may serve as the display control device. A digital still camera may serve as the image capturing device capable of carrying out wireless communication.

3 Claims, 12 Drawing Sheets

U.S. PATENT DOCUMENTS

| | | | |
|---|---|---|---|
| 2002/0063726 A1* | 5/2002 | Jouppi | 345/660 |
| 2002/0171737 A1 | 11/2002 | Tullis | |
| 2003/0011683 A1* | 1/2003 | Yamasaki et al. | 348/207.1 |
| 2003/0021591 A1* | 1/2003 | Grosvenor et al. | 386/124 |
| 2003/0058343 A1* | 3/2003 | Katayama | 348/207.1 |
| 2004/0012810 A1* | 1/2004 | Haas et al. | 358/1.15 |
| 2004/0032495 A1* | 2/2004 | Ortiz | 348/157 |
| 2004/0111324 A1* | 6/2004 | Kim | 705/22 |
| 2004/0148404 A1* | 7/2004 | Muroya et al. | 709/228 |
| 2004/0218045 A1* | 11/2004 | Bodnar et al. | 348/207.1 |
| 2006/0085753 A1* | 4/2006 | Vance et al. | 715/753 |
| 2006/0200356 A1* | 9/2006 | Wan | 705/1 |
| 2007/0013801 A1* | 1/2007 | Sezan et al. | 348/333.01 |
| 2007/0286144 A1* | 12/2007 | Miyake | 370/338 |

FOREIGN PATENT DOCUMENTS

| | | |
|---|---|---|
| JP | 11-284986 | 10/1999 |
| JP | 11-317898 | 11/1999 |
| JP | 2000-181588 | 6/2000 |
| JP | 2001-83948 | 3/2001 |
| JP | 2002-33953 A | 1/2002 |
| JP | 2002-51240 | 2/2002 |
| JP | 2002-057936 | 2/2002 |
| JP | 2002-366565 | 12/2002 |
| JP | 2003-169187 A | 6/2003 |
| JP | 2003-333673 A | 11/2003 |
| WO | WO 02/23885 A1 | 3/2002 |

OTHER PUBLICATIONS

Japanese Office Action issued in corresponding Japanese Patent Application No. 2003-006453, dated Dec. 14, 2006.

Chinese Office Action issued in corresponding Chinese Patent Application No. 200410001296.5, dated Jan. 26, 2007.

British Examination Report, issued in corresponding British Patent Application No. 0509839.7, dated on Jul. 20, 2007.

Chinese Office Action, with its English translation, issued in Chinese Patent Application No. 200410001296.5 dated May 23, 2008.

Japanese Office Action issued in corresponding Japanese Patent Application No. JP 2003-006453, dated Sep. 26, 2006.

* cited by examiner

CAPTURED IMAGE OUTPUTTING SYSTEM, DISPLAY CONTROL APPARATUS, LIQUID CRYSTAL PROJECTOR AND DIGITAL CAMERA THAT TRANSMIT IMAGES VIA WIRELESS NETWORK

BACKGROUND OF THE INVENTION

1. Field of the Invention

The present invention relates to a display control method and a shot image outputting system, a display control apparatus, a liquid crystal projector and a digital camera utilizing said display control method, and it particularly relates to a technology by which to transmit the shot images via a wireless network.

2. Description of the Related Art

Display apparatuses, such as liquid crystal projectors capable of projecting images on a screen, have been used mainly in various presentations of a business or academic nature. With the widening use of DVDs in recent years, however, low-priced liquid crystal projectors are being developed one after another as a component product of home theaters. This trend for lower prices is making it easier to introduce liquid crystal projectors for use in classes of school education.

On the other hand, contents to be projected by liquid crystal projectors are often images shot by digital cameras. Recently, technologies are being proposed for displaying images by connecting a digital camera directly to a liquid crystal projector without the use of a personal computer as a medium (see, for example, the Related Art List (1) below).

Related Art List (1) Japanese Patent Application Laid-Open No. Hei11-317898.

According to the conventional technologies as mentioned above, however, when a digital camera is directly connected to a liquid crystal projector, the operator cannot leave the side of the liquid crystal projector while displaying the images in the digital camera on the screen or switching images thereon. As a result, when the user tries to shoot images with the digital camera connected to the liquid crystal projector, the shooting range is inconveniently restricted to the close vicinity of the liquid crystal projector. Furthermore, since the operator position is limited to the close proximity of the liquid crystal projector, the operation becomes difficult especially when a plurality of people are to operate it by turns. Therefore, such a mode of use is not necessarily suited to the scenes of school education in which a plurality of students make their presentations using their respective images.

SUMMARY OF THE INVENTION

The present invention has been made in view of the foregoing circumstances and an object thereof is to improve facility in the displaying of images in a digital camera through the use of a projector. Another object of the present invention is to propose new modes of usage in the combination of a projector and a digital camera.

A preferred embodiment according to the present invention relates to a display control method. This method includes: determining, by an image capturing device and a display system, specifications of a captured image that is to be transmitted, based on a display capacity thereof; transmitting a captured image conforming to the specifications from the image capturing device to the display system via wireless communication; and receiving the transmitted image by the display system and displaying the received image. According to this embodiment, an image conforming to the display capacity of the display system is transmitted from the image capturing device. Thus, an optimum image is easily displayed without manually setting the resolution or file format of the image.

Another preferred embodiment according to the present invention relates to a captured image outputting system. This system includes: an image capturing device which captures an image of an object and transmits the image via wireless communication; and a display system which receives via wireless communication the image transmitted from the image capturing device and displays the received image. Moreover, prior to transmission of the image, specifications of an image that is to be transmitted are determined by the image capturing device and the display system. The specifications may be determined immediately before the transmission of the image or before shooting the image. For example, the specifications may be determined at the time of power-on of the image capturing device. When the specifications are determined before shooting the image, the image may be shot by the image capturing device under a condition most suitable for the specifications. The display system may send information on the display capacity thereof to the image capturing device, so that the specifications may be determined by selecting it at an image capturing device side. Conversely, the image capturing device may send information on an image capturing capacity to the display system, so that the specifications may be determined by selecting it at a display system side. In this embodiment, too, an image conforming to the display capacity of the display system is transmitted from the image capturing device. Thus, a most appropriate image can be displayed without manually setting the resolution or file format of the image.

Still another preferred embodiment according to the present invention relates to a display control method. This method includes: capturing an image of an object; transmitting the captured image, upon the capturing, from an image capturing device to an external display system via wireless communication; and displaying the captured image almost simultaneously on both a display unit built in the image capturing device and the display system. According to this embodiment, the image shot by the image capturing device is automatically transmitted to the display system without going through a step where the transmission of the captured image is manually instructed, and is immediately displayed. Thus, an operator of an image capturing device, that is, a person who photographs the image can easily and simply display on the display system the image in the image capturing device without any complicated operation. Furthermore, the display system can be used in substitution for a display unit built in the image capturing device, in which case the operationality thereof and the immediacy of reproduction will be kept intact.

Still another preferred embodiment according to the present invention relates to a captured image outputting system. This system includes: an image capturing device which captures an image of an object and transmits the captured image via wireless communication; and a display system which receives via wireless communication the image transmitted from the image capturing device and displays the received image. Moreover, upon the capturing of the image, the captured image is displayed almost simultaneously on both a display unit built in the image capturing device and the display system. In this embodiment, too, the image shot is automatically transmitted to the display system and instantaneously displayed. Thus, the operationality thereof and the immediacy of reproduction will be kept intact.

Still another preferred embodiment according to the present invention relates to a display control method. This method includes: reading out by an image capturing device an image specified to be displayed on a display unit built in the image capturing device; transmitting the captured image, upon the reading out, from the image shooting device to an external display system via wireless communication; and displaying the display-specified image almost simultaneously on both the display unit and the display system. According to this embodiment, the images to be reproduced at the display unit of the image capturing device are automatically transmitted to the display system and displayed without going through a step where the transmission of the captured image is manually instructed, and are displayed instantaneously. Thus, an operator of an image capturing device can easily and simply display on the display system the image in the image capturing device without any complicated operation. Furthermore, the display system can be used in substitution for a display unit built in the image capturing device, in which case the operationality thereof and the immediacy of reproduction will be kept intact.

Still another preferred embodiment according to the present invention relates to a captured image outputting system. This system includes: an image capturing device which reads out a captured image and transmits the captured image via wireless communication; and a display system which receives via wireless communication the image transmitted from the image capturing device and displays the received image. Moreover, upon readout of the image, the read-out image is displayed almost simultaneously on both a display unit built in the image capturing device and the display system. In this embodiment, too, the images to be reproduced at the display unit of the image capturing device are automatically transmitted to the display system and displayed. Thus, the image in the image capturing device can be simply displayed on the display system, so that the operationality thereof and the immediacy of reproduction can be kept intact.

Still another preferred embodiment according to the present invention relates to a display control method. This method includes: recognizing a plurality of display systems capable of carrying out wireless communication; selecting any of the plurality of display systems as a transmission destination or transmission destinations to which a captured image is transmitted via wireless communication; and transmitting the captured image, upon the capturing of the image, to the thus selected display system or display systems via wireless communication. According to this embodiment, a single unit of image capturing device can be connected to a plurality of display systems, and the display destination can be selected from among the plurality of display systems. A plurality of image capturing devices can also be connected to a plurality of display systems. Here, the "display destination" means a display system to which the shot image is to be transmitted. Thus, the combination of a single or plurality of display systems and a single or a plurality of image capturing devices enhances the flexibility of the image outputting system, thus widening the range of usage thereof.

Still another preferred embodiment according to the present invention relates to a captured image outputting system. This system includes: an image capturing device which captures an image of an object and transmits the captured image via wireless communication; and a plurality of display systems which receive via wireless communication the image transmitted from the image capturing device and display the received image. Moreover, prior to transmission of the image, the image capturing device recognizes a plurality of display systems as transmission destinations to which a captured image is to be transmitted, selects any of the recognized plurality of display systems and transmits the captured image, upon the capturing of the image, to the thus selected display system or display systems via wireless communication. For example, the display system to which the shot image is to be transmitted (hereinafter referred to as "display destination" also) may be selected according to a resolution of an image shot, or different display destinations may be selected for the respective images at the time of continuous shots. In this embodiment, too, a single unit of image capturing device can be selectively displayed on a plurality of display systems, so that the display systems and the image capturing device can be combined in a flexible manner.

Still another preferred embodiment according to the present invention relates to a display control method. This method includes: recognizing a plurality of image capturing devices capable of carrying out wireless communication; selecting any of the plurality of image capturing devices as a transmission source or transmission sources from which a captured image is transmitted via wireless communication; capturing an image or images of an object by the selected image capturing device or devices; and transmitting the captured image or images, upon the capturing of the image or images, to a display system via wireless communication. According to this embodiment, a plurality of image capturing devices can be connected to a single unit of display system, so that the image can be transmitted alternately from among the respective image capturing devices to the display system under certain rule and displayed. A plurality of image capturing devices may also be connected to a plurality of display systems. Thus, the combination of a single or plurality of display systems and a single or a plurality of image capturing devices enhances the flexibility of the image outputting system, thus widening the range of usage thereof.

Still another preferred embodiment according to the present invention relates to a captured image outputting system. This system includes: a plurality of image capturing devices which capture images of an object and transmit the captured images via wireless communication; and a display system which receives via wireless communication the images transmitted from the plurality of image capturing devices and displays the received images. Moreover, prior to reception of the image, the display system recognizes a plurality of image capturing devices as transmission sources from which captured images are to be transmitted, selects any of the recognized plurality of image capturing devices and receives the captured image or images, upon the capturing of the image, from the thus selected image capturing device or devices via wireless communication. In this embodiment, too, a plurality of image capturing devices are connected to a single unit of display system, and the image can be alternately displayed on the respective image capturing devices. Thus, the display systems and the image capturing device can be combined in a flexible manner.

Still another preferred embodiment according to the present invention relates to a display control method. This method includes: determining the permission or rejection of display of an captured image based on a predetermined condition for permission, prior to transmitting the captured image from an image capturing device to a display system via wireless communication and displaying the captured image on the display system; and displaying on the display system the captured image a display of which is permitted by the determining. The condition for permission may be such that the permission or rejection of display may be determined for each of the captured images or determined for each of image capturing devices. According to this embodiment, the timing at which the image is displayed or the object of an image can be restricted. Thus, the object to be displayed which is transmitted from the image capturing device side can be restricted or managed at a display system side.

Still another preferred embodiment according to the present invention relates to a captured image outputting system. This system includes: an image capturing device which captures an image of an object and transmits the captured image via wireless communication; and a display system which receives via wireless communication the image transmitted from the image capturing device and displays the received image. Moreover, the display system determines whether the display of the transmitted image is permitted or rejected based on a predetermined condition for permission, and displays the transmitted image only if the display thereof is permitted. A structure may be such that a decision on permission or rejection of display is automatically made or that the decision is manually made by an operator of the display system. Moreover, the reception of an image may be permitted regardless of the permission or rejection of display, or the reception of the image may be rejected unless the display thereof is permitted. In this embodiment, too, the object to be displayed on the display system can be controlled at a display system side.

Still another preferred embodiment according to the present invention relates to a display control method. This method includes: detecting information on connection status of wireless communication between an image capturing device and a display system; and displaying the information on connection status by at least one of the image capturing device and the display system. According to this embodiment, the status between the image capturing device and the display system such as status of establishing wireless communication, status of image transmission, status of radio wave can be displayed on either the display system or the image capturing device or on both the display system and the image capturing device. Thus, a party with which the image capturing device is communicating can be easily grasped regardless of the communication status. Furthermore, the display system can be utilized in substitution for a display unit built in the image capturing device.

Still another preferred embodiment according to the present invention relates to a captured image outputting system. This system includes: an image capturing device which captures an image of an object and transmits the captured image via wireless communication; and a display system which receives via wireless communication the image transmitted from the image capturing device and displays the received image. Moreover, at least one of the image capturing device and the display system detects information on connection status of wireless communication between the image capturing device and the display system, and displays the information on connection status. In this embodiment, too, the communication status between the image capturing device and the display system can be displayed on either the display system or the image capturing device or on both the display system and the image capturing device. Thus, the communication status can be easily grasped.

Still another preferred embodiment according to the present invention relates to a display control method. This method includes: determining whether displaying a captured image by a display system is permitted or rejected wherein the captured image is transmitted from an image capturing device to the display system via wireless communication; and displaying information on whether the displaying is permitted or rejected by the display system. The permission or rejection of the displaying may be such that a specific image capturing device is permitted or rejected or that the displaying at a specific timing is permitted or rejected. According to this embodiment, displayed is the status of restriction imposed on the contents displayed by the display system. Thus, objects the display of which is permitted by the display system can be clarified, and the object to be displayed can be easily grasped even from the image capturing device side.

Still another preferred embodiment according to the present invention relates to a captured image outputting system. This system includes: an image capturing device which captures an image of an object and transmits the captured image via wireless communication; and a display system which receives via wireless communication the image transmitted from the image capturing device and displays the received image. Moreover, the display system determines whether it is permitted or rejected to display the image captured by the image capturing device on the display system, and displays information on the thus determined permission or rejection of the display thereof. In this embodiment, too, the status of restriction imposed on the contents displayed by the display system can be easily grasped.

Still another preferred embodiment according to the present invention relates to a display control method. This method includes: generating a settings image which visually represents settings information necessary to establish wireless communication between an image capturing device and a display system; displaying the settings image; capturing an image of the displayed settings image as an object; recognizing the settings information, based on the captured image; and establishing wireless communication between the image capturing device and the display system, based on the recognized settings information. According to this embodiment, the respective functions of both the image capturing device and the display system are utilized to the full extent, thereby the communication is automatically established without going through any manual set-up operation. Thus, the image capturing device can be easily connected with the display system in a simplified manner, without going through any complicated set-up operation.

Still another preferred embodiment according to the present invention relates to a captured image outputting system. This system includes: an image capturing device which captures an image of an object and transmits the captured image via wireless communication; and a display system which receives via wireless communication the image transmitted from the image capturing device and displays the received image. Moreover, the display system generates a settings image which visually represents settings information necessary to establish wireless communication with the image capturing device and displays the thus generated settings image. The image capturing device shoots an image of the displayed settings image as an object, recognizes the settings information based on the shot image and establishes wireless communication with the display system, based on the recognized settings information. In this embodiment, too, the image capturing device can be automatically connected with the display system without going through any complicated set-up operation.

It is to be noted that any arbitrary combination of the above-described structural components and expressions changed between a method, an apparatus, a system, a computer program, a recording medium having stored computer programs therein, a data structure and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention. It is to be noted here that in the patent specifications the terms "image capturing," and "image shooting," as well as "a captured image," and "a shot image" are used interchangeably.

Figure 1:
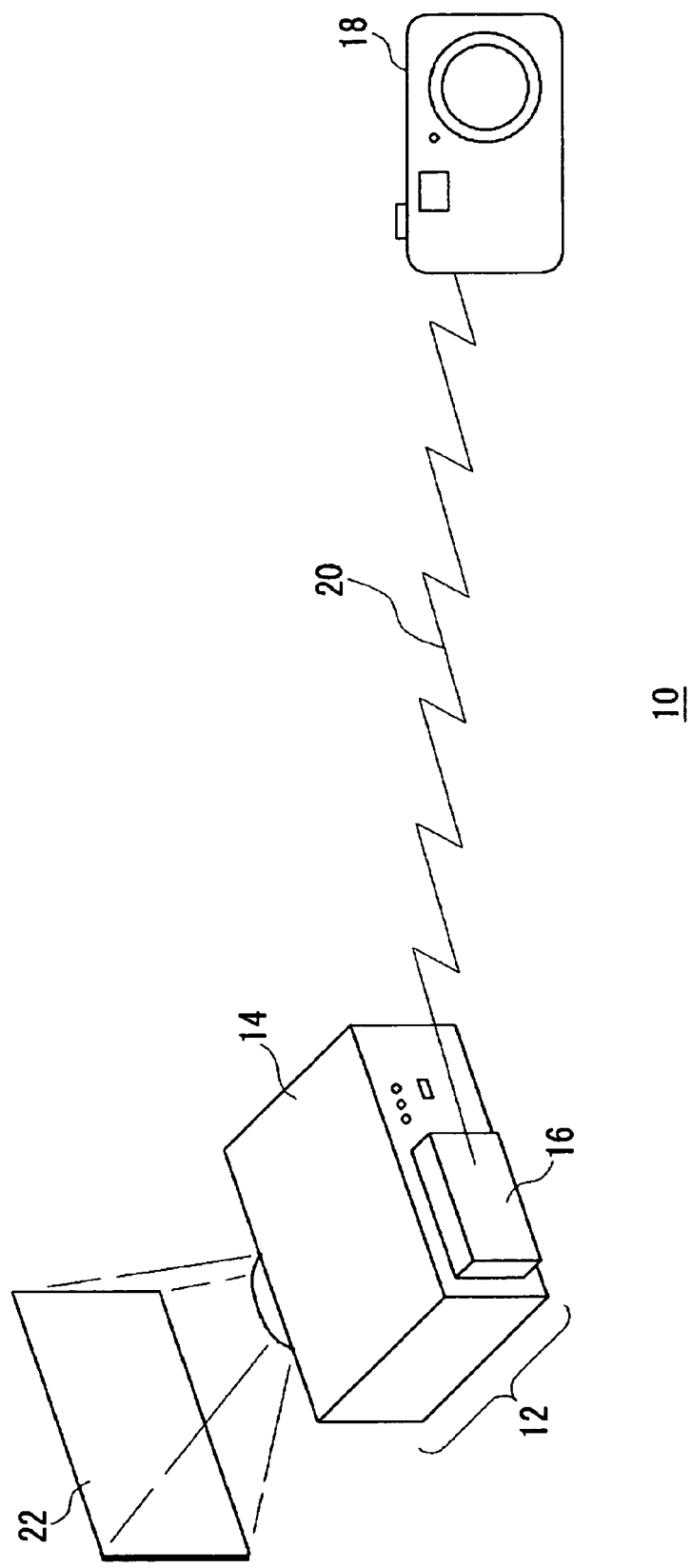
FIG. 1 shows a basic structure of a captured image output system 10.

FIG. 1 shows a basic structure of a captured image output system 10. An image captured by an image capturing device 18 is transmitted to a display control device 16 of a display system 12 via wireless communication 20. The display control device 16 inputs the received image to a display device 14 of the display system 12. The display device 14 projects the inputted image onto a screen. A projected screen 22 instantaneously displays the image having been captured just now by the image capturing device 18.

The image capturing device 18 is a digital still camera equipped with a wireless LAN function, for instance. The wireless communication 20 may include such communication modes as wireless LAN communication of mainly IEEE802.11a/b/g or Bluetooth (trademark). The display system 12 is comprised of a display device 14 and a display control device 16. A liquid crystal projector is used herein as an example of the display device 14, but a television set may be used instead. The display control device 16 is, for instance, a device provided with a wireless LAN function and an image signal conversion function and is an optional device to be connected to an image input terminal of a liquid crystal projector. It is to be noted here that the display system 12 may be constituted by building the display control device 16 into the display device 14.

In terms of hardware, the structure of the image capturing device 18 and the display control device 16 may be realized by a CPU, memory, communication module or other LSIS. In terms of software, it may be realized by memory-loaded programs having a data transmission/reception function, image processing function or the like, but drawn in FIGS. 2 to 14 and described here are function blocks that are realized in cooperation with those. Thus, it is understood by those skilled in the art that these function blocks can be realized in a variety of forms by hardware only, software only or the combination thereof.

Figure 2:
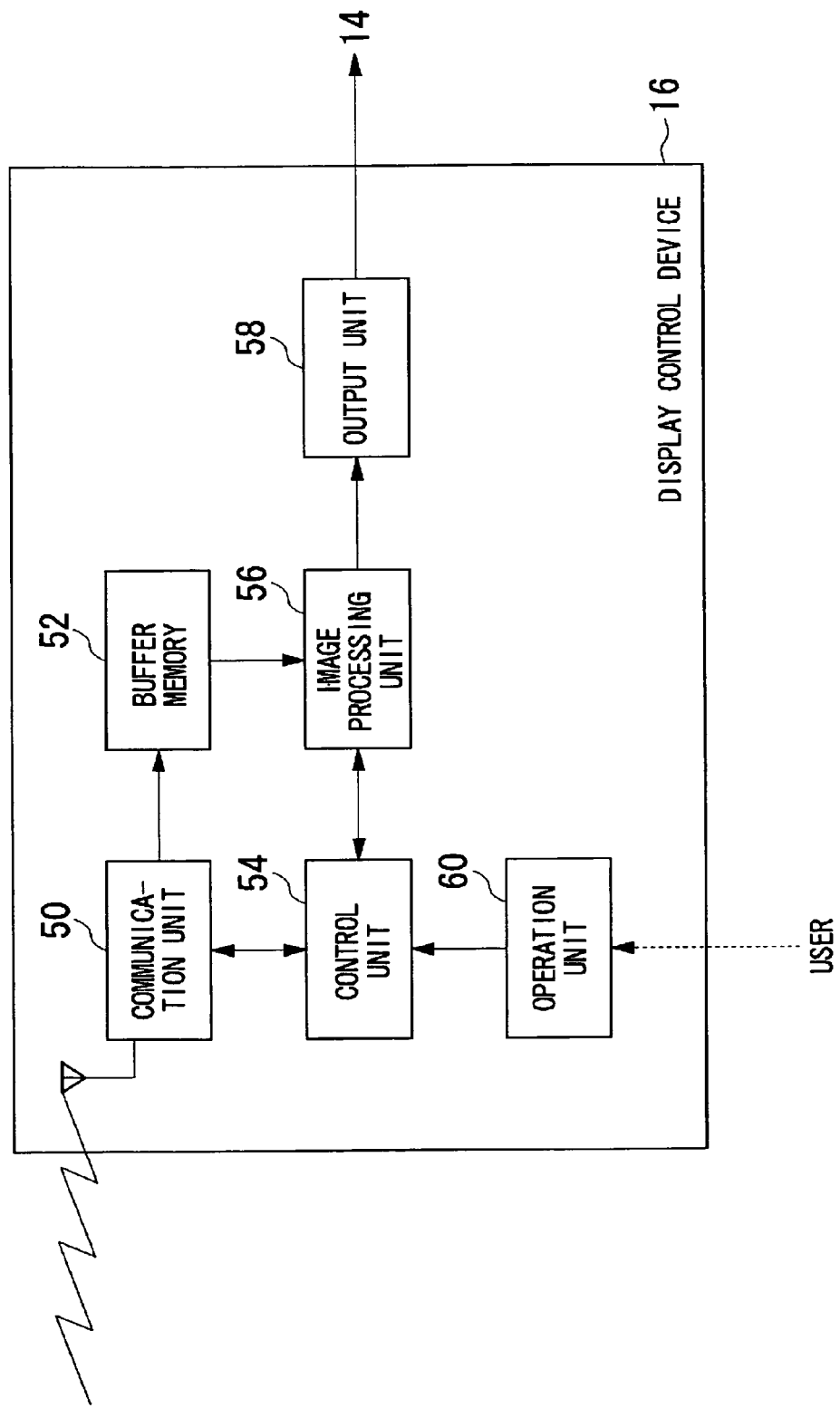
FIG. 2 is a functional block diagram showing a basic structure of a display control device.

FIG. 2 is a functional block diagram showing a basic structure of a display control device 16. The display control device 16 includes a communication unit 50, a buffer memory 52, a control unit 54, an image processing unit 56, an output unit 58 and an operation unit 60. Each of these units communicates with an external source via the communication unit 50. The communication unit 50 receives images from the image capturing device 18 and stores the images in the buffer memory 52. The buffer memory 52 is a RAM that stores temporarily data of still pictures or moving pictures that are compressed in a JPEG or MPEG format. The image processing unit 56 reads out an image from the buffer memory 52 and generates image data by carrying out such processing as decoding and image signal conversion. The output unit 58 outputs the image data generated by the image processing unit 56 to the image input terminal of the display device 14. The control unit 54 controls the operation of such units as the communication unit 50 and the image processing unit 56. The operation unit 60 is operated by a user and sends instructions according to the operation to the control unit 54.

Figure 3:
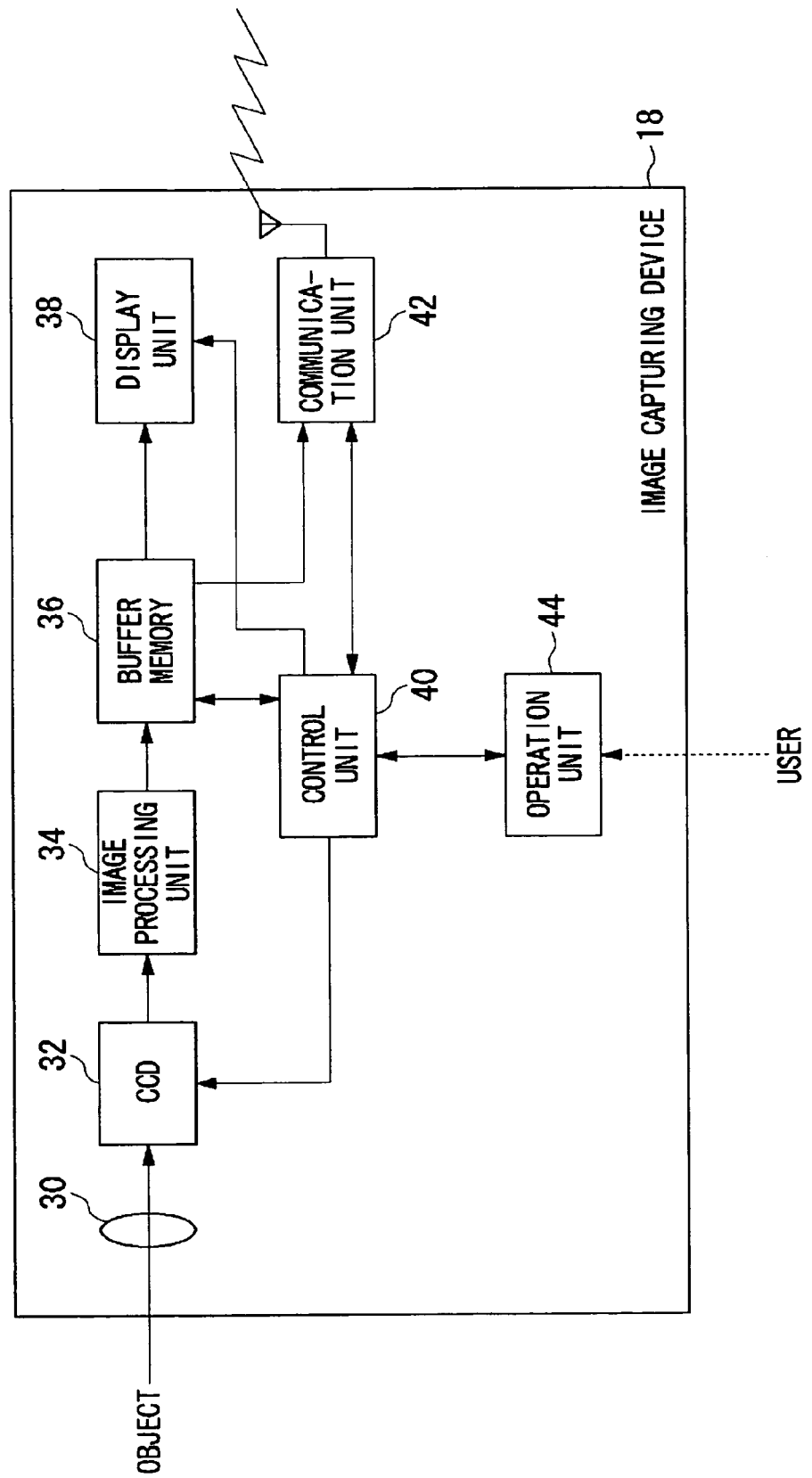
FIG. 3 is a functional block diagram showing a basic structure of an image capturing device.

FIG. 3 is a functional block diagram showing a basic structure of an image capturing device 18. The image capturing device 18 includes a lens 30, a CCD 32, an image processing unit 34, a buffer memory 36, a display unit 38, a control unit 40, a communication unit 42 and an operation unit 44. The lens 30 takes in a light flux originating from an object and forms an image therefrom, and the CCD 32 converts the formed image into an electrical signal. The image processing unit 34 A/D converts the electrical signal and then compresses this converted signal before storing it in the buffer memory 36. The buffer memory 36 is a RAM that stores temporarily data of still pictures or moving pictures that are compressed in JPEG or MPEG format. The display unit 38 displays an image stored in the buffer memory 36 on the screen thereof. The communication unit 42 transmits the image to the display control device 16 via wireless communication. Each of these units communicates with an external source via the communication unit 42. The control unit 40 controls the operation of such units as the CCD 32, the display unit 38 and the communication unit 42. The operation unit 44 receives signals of operation from a user and sends instructions according to the operation to the control unit 40.

Figure 4:
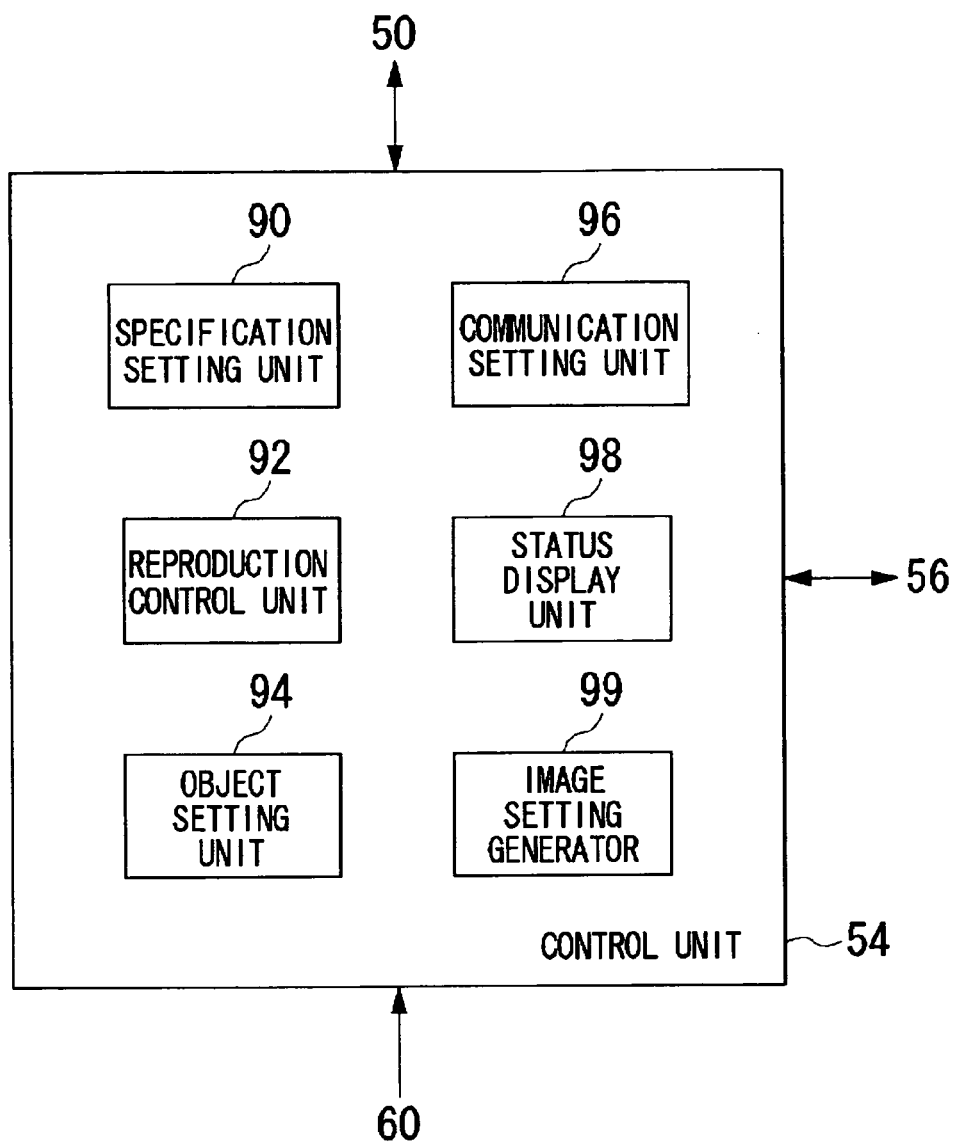
FIG. 4 is a functional block diagram showing a detailed structure of a control unit in a display control device.

FIG. 4 is a functional block diagram showing a detailed structure of a control unit 54 of a display control device 16. The control unit 54 includes a specification setting unit 90, a reproduction control unit 92, an object setting unit 94, a communication setting unit 96, a status display unit 98 and an image settings generator 99. The specification setting unit 90 determines the specifications for an image to be received from the image capturing device 18, and the reproduction control unit 92 controls the output of an image to the display device 14. The object setting unit 96 sets the object of an image to be displayed by the display system 12, and the communication setting unit 96 controls the wireless communication with the image capturing device 18. The status display unit 98 outputs various information, including the state of communication, to the display device 14, and the image settings generator 99 outputs information necessary for the image capturing device 18 to establish wireless communication with the display control device 16. The detailed functions of the above-described structures will be described later.

Figure 5:
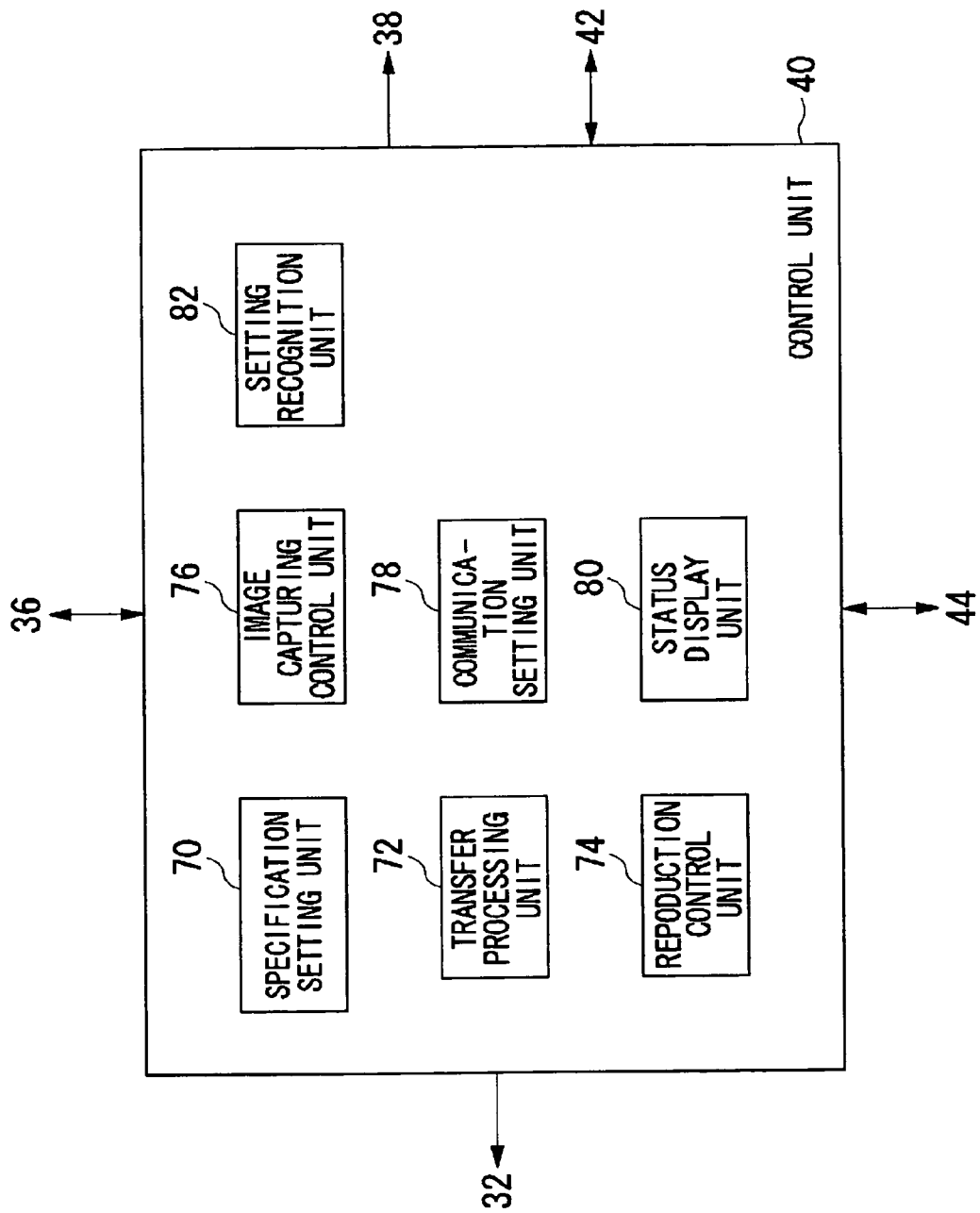
FIG. 5 is a functional block diagram showing a detailed structure of a control unit in an image capturing device.

FIG. 5 is a functional block diagram showing a detailed structure of a control unit 40 of an image capturing device 18. The control unit 40 includes a specification setting unit 70, a transfer processing unit 72, a reproduction control unit 74, an image capturing control unit 76, a communication setting unit 78, a status display unit 80 and a settings recognition unit 82. The specification setting unit 70 determines the specifications for an image to be transmitted to the display control device 16, and the transfer processing unit 72 controls the transmission of an image to the display control device 16. The reproduction control unit 74 controls the reproduction of an image by the display unit 38, and the image capturing control unit 76 controls the image capturing by the CCD 32. The communication setting unit 78 sets information necessary for establishing wireless communication with the display control device 16, and the status display unit 80 displays various information, including the state of communication, on the display unit 38. The detailed functions of the components of the above-described structure will be described later.

Hereinbelow, the representative functions of a captured image output system 10 will be explained one by one.

The first of the functions is a function of selecting the specifications for an image to be displayed. The specification setting unit 90 shown in FIG. 4 stores the display capacity of the display system 12 in advance. The display capacity is denoted by a resolution, such as VGA, XGA or SXGA, or by a file format, such as JPEG or TIFF, for instance. The specification setting unit 90 transmits to the image capturing device 18 data on the display capacity of the display system 12 as the specifications for an image that can be displayed by the display system 12. The specification setting unit 70 shown in FIG. 5 acquires data on the specifications for the image from the specification setting unit 90 shown in FIG. 4. The specification setting unit 70 stores the image capturing capacity of the image capturing device 18 in advance. The image capturing capacity is denoted by a resolution of an image that can be captured or by a file format, such as JPEG or TIFF, for instance. The specification setting unit 70 compares the display capacity acquired from the specification setting unit 90 with the image capturing capacity of the image capturing device 18, and selects appropriate capacity specifications. For example, if there is any common item of specifications in the resolution or file format, the common specification is selected, but if there is not, the image is converted in such a way as to conform to the display capacity. Where there are a plurality of common specifications, one with higher image quality may be chosen. This selection and adjustment of capacity specifications may be done in relation to the display system 12 at the time of power-on of the image capturing device 18.

Figure 6:
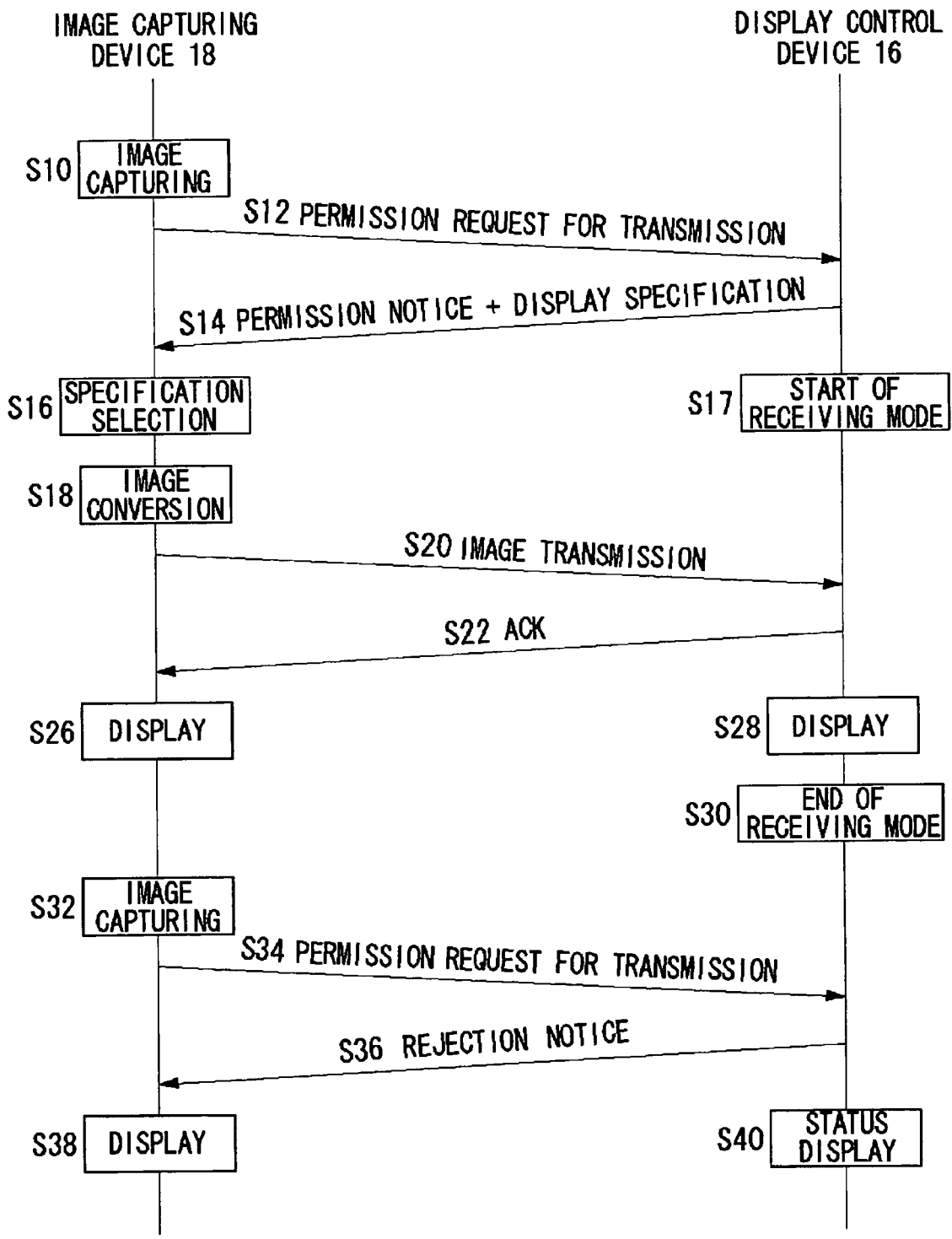
FIG. 6 is a flowchart showing a process of transmitting a captured image from an image capturing device to a display control device.

FIG. 6 is a flowchart showing the process of transmitting a captured image from an image capturing device 18 to a display control device 16. The image capturing device 18 captures an image (S10) and sends a permission request for transmission of the captured image to a display control device 16 (S12). In response to this request, the display control device 16 sends a permission notice and specifications for a displayable image to the image capturing device 18 (S14). The image capturing device 18 determines the specifications for an image to be transmitted to the display control device 16 according to its image capturing capacity (S16) and converts the image as necessary (S18). The image capturing device 18 transmits the image to the display control device 16 (S20), and the display control device 16 returns an ACK (acknowledgement) response to the image capturing device 18 (S22), thus completing the transfer of an image. The process subsequent to the step S22 will be described later.

The second of the functions is a function of the display unit 38 of the image capturing device 18 and the display control device 16 simultaneously displaying a captured image immediately after the capturing thereof. When an image is captured under the control of the image capturing control unit 76 shown in FIG. 5, the transfer processing unit 72, upon capturing of the image, carries out a control to immediately transmit the captured image to the display control device 16. When the image transmission to the display control device 16 is completed, the reproduction control unit 74 instructs the display unit 38 to display the image. The reproduction control unit 92 shown in FIG. 4 carries out a control to immediately output the image received from the image capturing device 18 to the display device 14. As a result, the captured image is displayed almost simultaneously on the display unit 38 and the display system 12 even without any instructions given by the user of the image capturing device 18.

Referring back to FIG. 6, after the image is transmitted from the image capturing device 18 to the display control device 16 through the process of S10 to S22 as described above, the display unit 38 of the image capturing device 18 and the display system 12 display the same image almost simultaneously (S26, S28).

The third of the functions is a function of simultaneously displaying the image reproduced by the display unit 38 of the image capturing device 18 on the display system 12 also. When a reproduction of an image is instructed by the user of the image capturing device 18 via the operation unit 44, the reproduction control unit 74 shown in FIG. 5 controls the processing to read out the image to be reproduced. The readout destination is the buffer memory 36 or an external server. When the image stored in the external server is to be reproduced, the image is received by the communication unit 42. The transfer processing unit 72, upon the readout of the image, carries out a control to immediately transmit the readout image to the display control device 16. When the image transmission to the display control device 16 is completed, the reproduction control unit 74 instructs the display unit 38 to display the image. The reproduction control unit 92 shown in FIG. 4 carries out a control to immediately output the image received from the image capturing device 18 to the display device 14. As a result, the image to be reproduced is displayed almost simultaneously on the display unit 38 and the display system 12 even without any instructions given by the user of the image capturing device 18.

Figure 7:
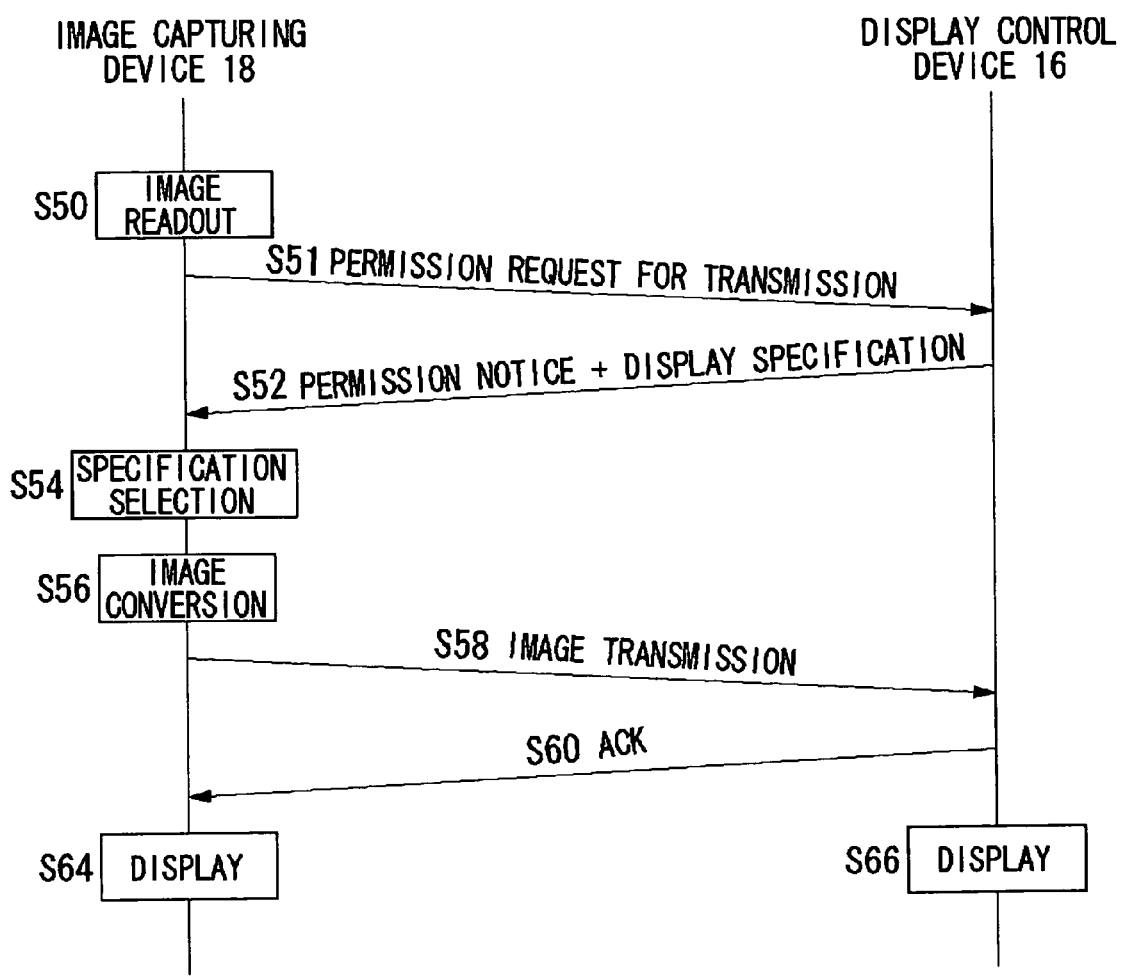
FIG. 7 is a flowchart showing a process of transmitting a captured image from an image capturing device to the display control device.

FIG. 7 is a flowchart showing the process of transmitting the captured image from the image capturing device 18 to the display control device 16. The image capturing device 18 reads out an image to be reproduced (S50) and sends a permission request for transmission of the read-out image to the display control device 16 (S51). In response to this request, the display control device 16 sends a permission notice and specifications for a displayable image to the image capturing device 18 (S52). The image capturing device 18 determines the specifications for an image to be transmitted to the display control device 16 according to the image to be reproduced (S54) and converts the image as necessary (S56). The image capturing device 18 transmits the image to the display control device 16 (S58), and the display control device 16 returns an ACK response to the image capturing device. 18 (S60). Then the image capturing device 18 and the display system 12 display the image almost simultaneously (S64, S66).

The fourth of the functions is a function for connecting a plurality of image capturing devices 18 with a plurality of display systems 12 in various combinations. If a plurality of units are denoted by n, the image capturing devices 18 and the display systems 12 may be combined in the ratio 1 to 1, 1 to n, n to 1 or n to n.

Figure 8A:
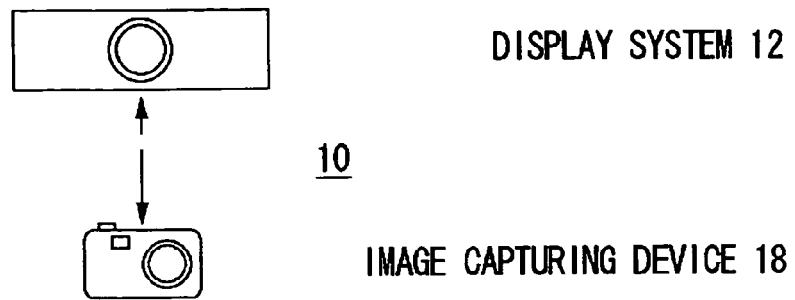
FIGS. 8A to 8D show examples of connection between a display system and an image capturing device in a captured image output system.

FIGS. 8A to 8D show examples of connection between the display system 12 and the image capturing device 18 in a captured image output system 10. FIG. 8A shows a minimum unit of combination, in which the image capturing devices 18 and the display systems 12 are connected to each other in the ratio 1 to 1. In this case, each of the above-mentioned units has only one party to communicate with, so that the object setting unit 94 in FIG. 4 and the transfer processing unit 72 in FIG. 5, for instance, have no need to carry out processing to select a destination or a source of transmission.

Figure 8B:
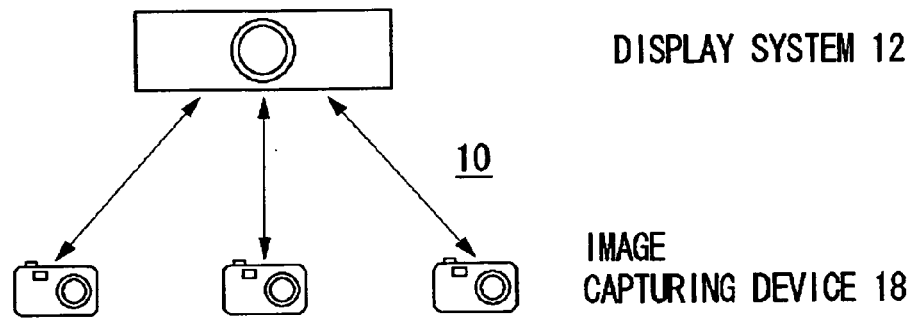

FIG. 8B shows a combination, in which the display system 12 is connected to the image capturing devices 18 in the ratio 1 to n. For example, a case of application in school may be assumed in which one display system 12 is installed in a classroom and a plurality of image capturing devices 18 are assigned to students. The object setting unit 94 shown in FIG. 4 recognizes the plurality of image capturing devices 18 by referring to information inherent thereto, such as their IP addresses or MAC addresses, and selects manually or automatically one of the plurality of image capturing devices 18 as the source of transmission of an image. As information on the general structure of the captured image output system 10, a predetermined supervisor may prepare a correspondence table of the names of users of the image capturing devices 18 and their IP addresses or MAC addresses beforehand. The correspondence table may be stored on a predetermined server and it may be acquired as the occasion demands by the object setting unit 94. Or some recording medium, such as a memory card storing the correspondence table, may be provided to each user, and the correspondence table may be read in by the object setting unit 94.

Figure 8C:
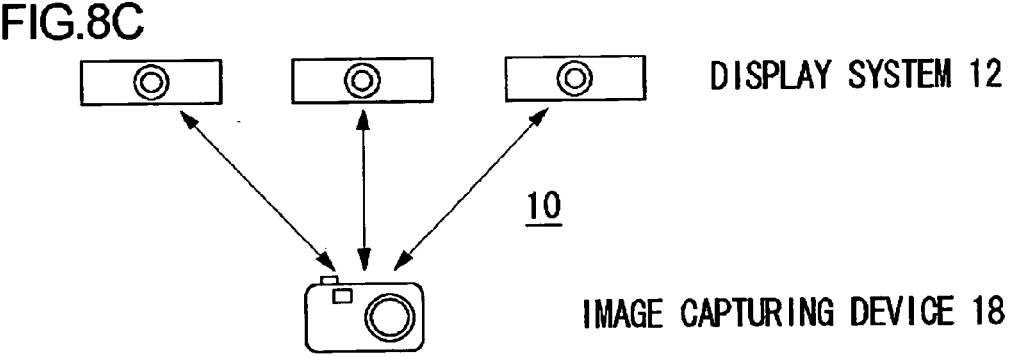

FIG. 8C shows a combination, in which the display systems 12 are connected to the image capturing device 18 in the ratio n to 1. Examples of assumed applications may include a structure in which a plurality of display systems 12 are installed and, when images are captured in succession by the image capturing device 18, the images are displayed one by one by different display systems 12, and a structure in which a plurality of images are displayed by different display systems 12 according to the resolution thereof. The transfer processing unit 72 shown in FIG. 5 recognizes the plurality of display systems 12 by referring to information inherent thereto, such as their IP addresses or MAC addresses, and selects manually or automatically one of the plurality of display systems 12 as the destination of transmission of an image. The general structure of the captured image output system 10 may be managed by a correspondence table, and the correspondence table may be acquired by the transfer processing unit 72.

Figure 8D:
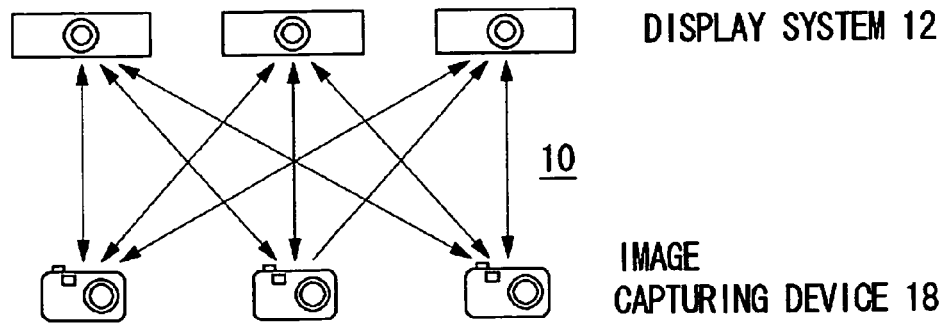

FIG. 8D shows a combination, in which the display systems 12 are connected to the image capturing devices 18 in the ratio n to n. This is a combination of FIG. 8B and FIG. 8C. For example, a case of application in a school as a whole may be assumed such that one display system 12 is installed in each of a plurality of classrooms and a plurality of image capturing devices 18 assigned to a plurality of students from each of the plurality of classrooms are connected thereto. Another case may be assumed such that a plurality of display systems 12 are installed and a plurality of image capturing devices 18 are allowed to transmit images, which are displayed by separate units of the display systems 12 in a "first come, first served" manner. Between the plurality of display systems 12 and the plurality of image capturing devices 18, a party to which an image is to be transmitted or a party from which an image is to be received may be selected manually or automatically.

Figure 9:
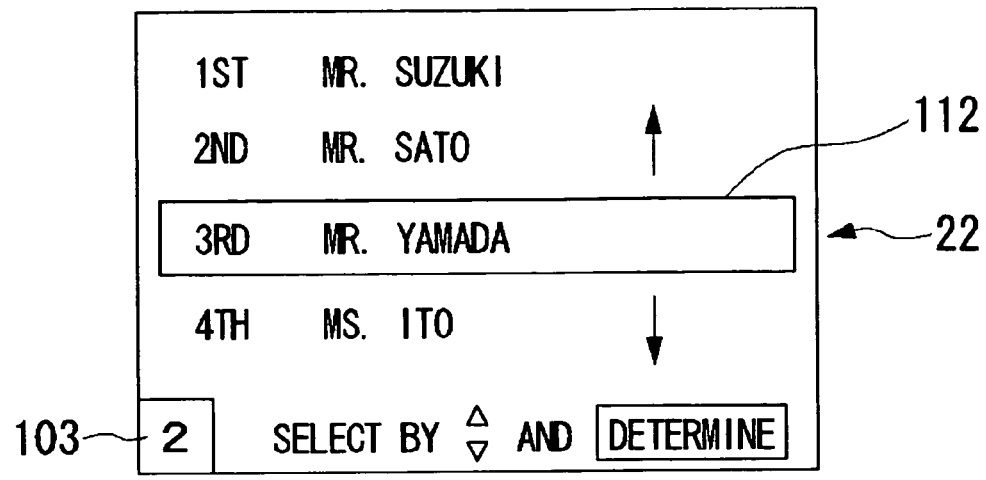
FIG. 9 illustrates by example a screen on which a transmission source of an image is selected.

FIG. 9 illustrates by example a screen on which a transmission source of an image can be selected. FIG. 9 represents a projected screen 22 projected on a screen by a display device 14, in which displayed are a list of device numbers for a plurality of image capturing devices 18 and a list of names of users thereof. A correspondence table of device numbers and user names may be prepared in advance by a manager of the captured image output system 10. A system number 103 indicating this display system 12 is displayed in a corner of the projected screen 22. The user operating the display system 12 can select from the list a user name to whom he/she gives a permission for an image transmission, by moving the cursor 112 up or down. According to user instructions like this, the object setting unit 94 of FIG. 4 selects a transmission source of an image and controls in such a manner that the image received from the transmission source is outputted to the display device 14. The object setting unit 94 may perform such a setting as to reject all the display of images by selecting none of the image capturing devices 18. The setting of acceptance or rejection of display to be determined by the selection as mentioned above is stored in the object setting unit 94 as a condition for permission.

Figure 10:
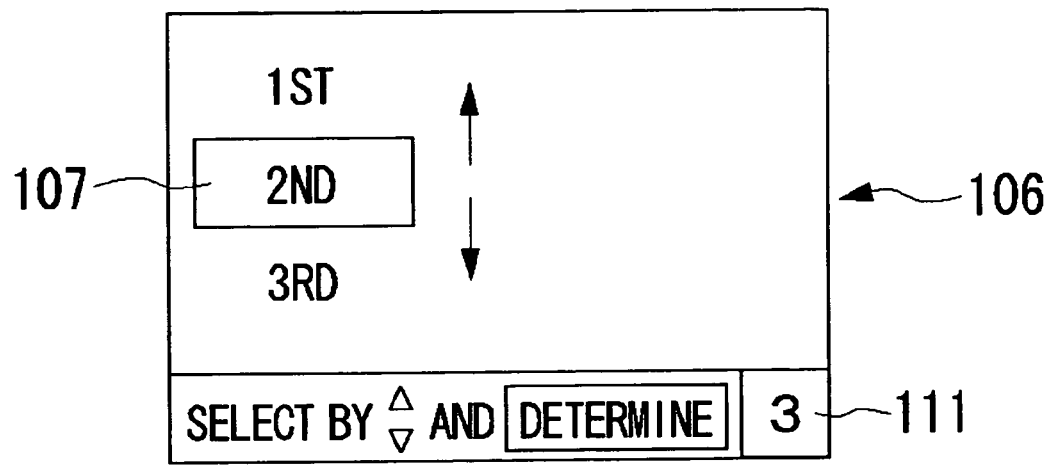
FIG. 10 illustrates by example a screen on which a transmission destination of an image is selected.

FIG. 10 illustrates by example a screen on which a transmission destination of an image can be selected. FIG. 10 represents a display screen 106 displayed by the display unit 38 of an image capturing device 18, in which a list of system numbers for a plurality of display systems 12 are displayed. The system numbers may be assigned to a plurality of display systems 12 in advance by a manager of this system. A device number 111 indicating this image capturing device 18 is displayed in a corner of the display screen 106. The user operating the image capturing device 18 can select from the list an image transmission destination, that is, a system number of the display system 12 on which he/she desires to have the image displayed, by moving the cursor 107 up or down. According to user instructions like this, the transfer processing unit 72 of FIG. 5 selects a transmission destination of an image and controls in such a manner that the image is transmitted to the display device 14, which is the transmission destination.

The fifth of the functions is a function for having an image permitted under a specific condition for permission displayed on the display system 12 by rejecting the display of the other images. The object setting unit 94 shown in FIG. 4 judges whether to accept or reject the display of each image according to a specific condition for permission. The specific conditions for permission may be decided in various ways as rules for accepting or rejecting each of the images. For example, the conditions for permission may be so set that for a predetermined period of time after an image is received and displayed by the display system 12, the display of subsequent images is rejected even when they are transmitted from the same image capturing device 18. As shown in FIG. 6, after a permission notice is transmitted from the display control device 16 to the image capturing device 18 (S14), a receiving mode, in which an image reception is awaited, is started (S17). An image is received (S20), and after the received image is displayed (S28), the receiving mode comes to an end (S30). Thereafter, even when the same image capturing device 18 captures a new image (S32) and transmits a permission request for an image transmission to the display control device 16 (S34), the display control device 16 responds to it with a rejection notice to the image capturing device 18 (S36). At this time, whereas the image capturing device 18 has the display unit 38 display the captured image (S38), the display control device 16 has the display device 14 display the status indicating the completion of the receiving mode (S40).

As an example of other conditions for permission, the condition may be so set that images to be displayed are determined on a "first come, first served" basis. In other words, this is a system wherein after the display control device 16 has entered the receiving mode, in which an image reception is awaited, only the image transmitted thereto first is displayed. Moreover, the condition for permission may be further established that the display of not only the image transmitted first but also the images subsequently transmitted from the same image capturing device 18 is permitted.

Figure 11:
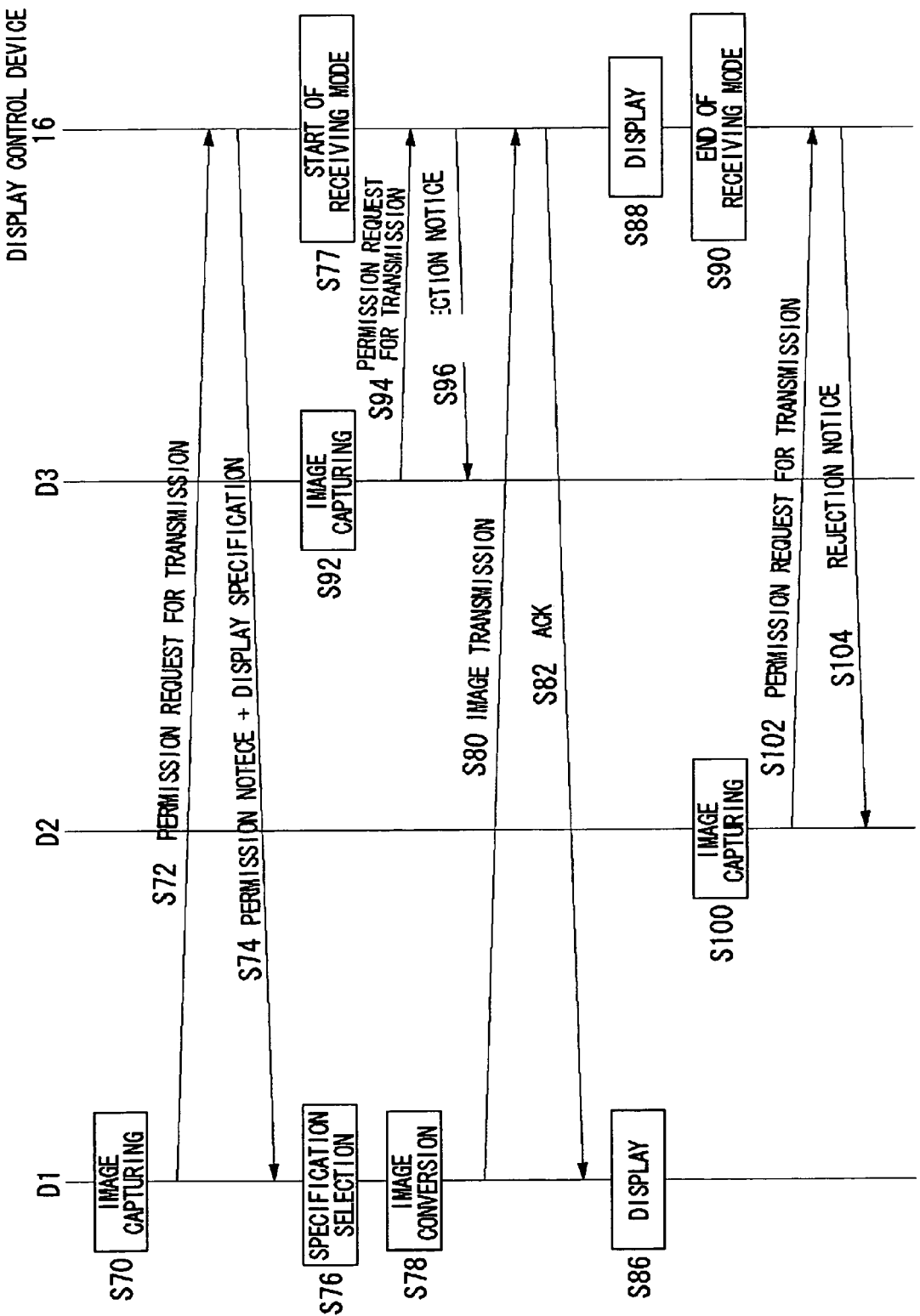
FIG. 11 shows a process in which images transmitted from three image capturing devices are displayed in "first come, first served" manner.

FIG. 11 shows the process in which images transmitted from three image capturing devices 18 are displayed in "first come, first served" manner. The three image capturing devices 18 are called camera D1, camera D2 and camera D3, respectively. First, the camera D1 captures an image (S70) and transmits a permission request for an image transmission to the display control device 16 (S72). To this, the display control device 16 responds with a permission notice and specifications for an image to be displayed (S74). The display control device 16 starts the receiving mode for camera D1 only (S77), and even when the camera D3 captures an image about this time (S92) and then transmits a permission request for an image transmission to the display control device 16 (S94), the display control device 16 responds to the permission request with a rejection notice (S96).

The camera D1, which has received a permission notice, determines specifications for the image (S76), converts the image as necessary (S78) and transmits the image conforming to the specifications to the display control device 16 (S80). To this, the display control device 16 sends an acknowledgement (ACK) response (S82). The camera D1 and the display system 12 display the image captured by camera D1 almost simultaneously (S86, S88), and the display control device 16 completes the receiving mode (S90). After this, even when the camera D2 captures an image (S100) and transmits a permission request for an image transmission to the display control device 16 (S102), the display control device 16 responds to the permission request with a rejection notice (S104).

As an example of other conditions for permission, the condition may be so set that, as described along with FIG. 9, the user operating the display system 12 selects manually a specific image capturing device 18 to which the display is permitted.

Figure 12:
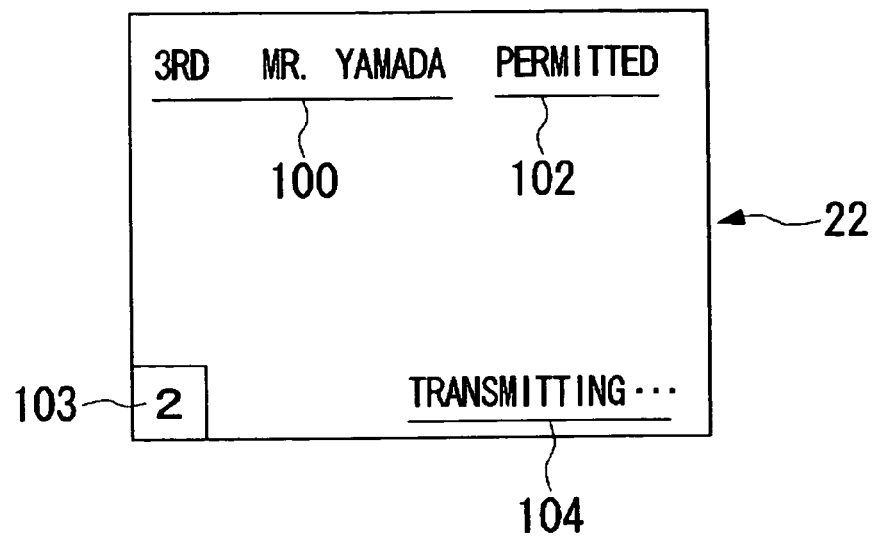
FIG. 12 shows display contents on a projected screen projected by a display system.

The sixth of the functions is a function for displaying the connection status of communication between the image capturing device 18 and the display control device 16. FIG. 12 shows display contents on a projected screen 22 projected by a display system 12. The projected screen 22 displays a connection status 104. The connection status 104 illustrated here is the characters "TRANSMITTING" which indicates that an image capturing device 18 is now transmitting an image to a display device 14. Another example of connection status 104 may be "ERROR" which indicates a disconnection of communication or a failure of image transmission. A still another example is "RECEIVED 104 KB" which may indicate a success in an image reception and the image size received.

Figure 13:
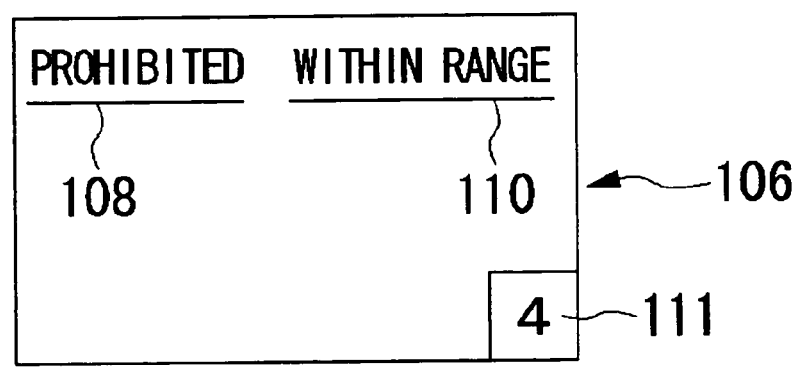
FIG. 13 shows display contents on a display screen of an image capturing device.

FIG. 13 shows display contents on a display screen 106 of an image capturing device 18. The display screen 106 also displays a connection status 110. The connection status 110 illustrated here is the characters "WITHIN RANGE" which indicates that an image capturing device 18 is now within range of wireless communication. When the image capturing device 18 is out of the range, the characters "OUTSIDE RANGE" is displayed as the connection status 110 on the display screen 106. The characters "TRANSMITTING," "ERROR," "RECEIVED 104 KB" and the like, such as those displayed on the projected screen of FIG. 12, may be displayed as connection status on the display screen 106. These display contents may be displayed simultaneously on both the display screen 106 and projected screen 22. This arrangement may allow the user to check on the connection status by seeing whichever of the display screen 106 and the projected screen 22.

The seventh of the functions is a function for displaying the permission or rejection of an image display for the image capturing device 18. Displayed on the projected screen 22 as shown in FIG. 12 are a permitted user name 100, which shows a user permitted to display an image, and a permission display 102. For example, in a system configuration wherein a plurality of image capturing devices 18 are connected to a single display system 12, the user of each image capturing device 18 can see who among the users is now permitted to display his/her image by taking a look at the display of permission or rejection on the projected screen 22. On the display screen 106 as shown in FIG. 13, the characters "PERMITTED" or "REJECTED" are displayed as display permit/reject indication 108, so that the user operating the image capturing device 18 can see whether he/she is now permitted to display his/her image or not by taking a look at the display screen 106.

The eighth of the functions is a function for automatically setting information necessary to establish wireless communication between the image capturing device 18 and the display control device 16. The communication setting unit 96 shown in FIG. 4 holds settings information necessary for the image capturing device 18 to establish wireless communication with the display device 14. The settings information may, for instance, be a MAC address, which is a hardware address inherent to the display device 14 as the minimum information, or may further include such other information as ESS-ID, WEP password and IP address that are necessary for setting a wireless LAN. The settings image generator 99 generates a settings image representing the settings information visually. For example, it may generate an image of a two-dimensional bar code showing a MAC address graphically or may generate an image simply displaying a character string for a MAC address. The settings image generator 99 outputs a settings image thus generated to the display device 14 and has the display device 14 display it on the projected screen 22. The image capturing device 18 captures the settings image displayed, and the settings recognition unit 82 shown in FIG. 5 reads the image and recognizes the settings information. Where a settings image displays a character string, the settings recognition unit 82 recognizes the settings information by character recognition. The communication setting unit 78 establishes communication with the display device 14 by using the settings information. As a method for establishing communication, communication for a minimum information exchange may first be secured by the use of a MAC address and then necessary settings information may further be exchanged to establish communication capable of an image transmission.

Using this function, it is possible to make a setting for wireless communication without manually inputting information to the image capturing device 18. Normally, an image capturing device 18 is not provided with information input interface for inputting characters or numbers, which has nothing to do with its intended purpose of image capturing. With this function equipped, therefore, the interface of the image capturing device 18 can be simplified without newly installing such user interface.

Figure 14:
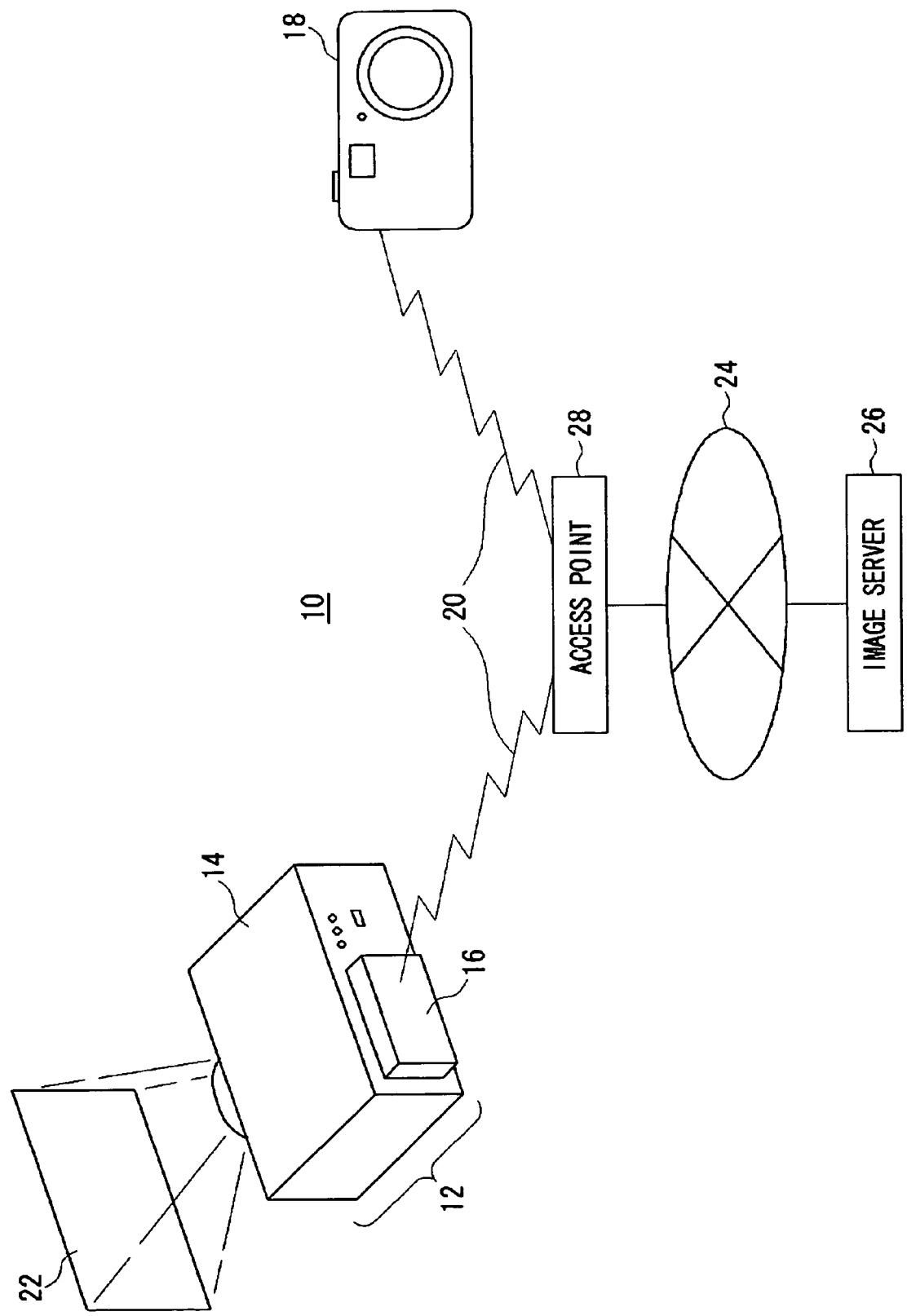
FIG. 14 shows an example of system configuration in which an image capturing device and a display control device are connected to each other via an access point.

FIG. 14 shows an example of system configuration in which an image capturing device 18 and a display control device 16 are connected to each other via an access point 28. Whereas FIG. 1 shows a case of connection between an image capturing device 18 and a display control device 16 in an ad hoc mode, FIG. 14 shows a case of connection in an infrastructure mode. Each of the image capturing device 18 and the display control device 16 establishes wireless communication with the access point 28, and the image capturing device 18 transmits an image to the display control device 16 via the access point 28. The access point 28 is connected to an image server 26 via a network 24, and the image capturing device 18 transfers a captured image to the image server 26 through the access point 28 and the network 24 and stores the captured image in a predetermined area of the image server 26. For the reproduction of the captured image, it is received when necessary from the image server 26 via the access point 28.

The wireless communication via an access point 28 as shown in FIG. 14 is particularly preferable for its simplicity of communication setting or communication control when the image capturing device 18 and the display control device 16 are connected with each other in the ratio 1:n, n:1 or n:n. Furthermore, since an image captured by the image capturing device 18 is stored in the image server 26, the display control device 16 may request to receive the image to be displayed from the image server 26, instead of the image capturing device 18 transmitting the image to be displayed by the display system 12. Moreover, the area where images are stored is not limited to the image server 26. Captured images may be stored in the image capturing device 18 or the display control device 16, and in such a case, information on which area stores such images is held by the image capturing device 18 or the display control device 16. As a result, the user can handle images without being conscious of where the images are stored.

The present invention has been described based on the embodiments which are only exemplary. It is understood by those skilled in the art that there exist other various modifications to the combination of each component and process described above and that such modifications are encompassed by the scope of the present invention.

By the sixth function of the present embodiments, information on connection status is displayed on both the projected screen 22 projected by the display system 12 and the display screen 106 of the image capturing device 18. In this case, the connection status displayed on the projected screen 22 and the connection status displayed on the display screen 106 may be either a different type or the same type of information. In a modified example, there may not only be an agreement in the type of connection status between the projected screen 22 and the display screen 106, but the arrangement may also be such that both the screens display the same image, thus achieving a nearly complete agreement in the screen contents. This structure therefore provides greater convenience to the user, who can check on the same contents by looking at whichever of the display screen 106 and the projected screen 22.

Although the present invention has been described by way of exemplary embodiments, it should be understood that many changes and substitutions may further be made by those skilled in the art without departing from the scope of the present invention which is defined by the appended claims.

What is claimed is:

1. A captured image outputting system, including:
   an image capturing device which captures an image of an object according to a user's instruction to capture the image and transmits the captured image via wireless communication; and
   a projector which receives via wireless communication the image transmitted from said image capturing device and displays the received image,
   wherein, upon the capturing of the image, the captured image is displayed almost simultaneously on both a display unit built in said image capturing device and said projector.

2. A captured image outputting system, the system including:
   an image capturing device which captures an image of an object according to a user's instruction to capture the image and transmits the captured image via wireless communication; and
   a display system which receives via wireless communication the image transmitted from said image capturing device and displays the received image,
   wherein, upon the capturing of the image, the captured image is displayed almost simultaneously on both a display unit built in said image capturing device and said display system.

3. An image capturing device comprising:
   an image capturing control unit which captures an image of an object according to a user's instruction to capture the image;
   a display unit which displays the captured image;
   a reproduction control unit which instructs the display unit to display the captured image, upon the capturing of the image; and
   a transfer processing unit which transmits the captured image to a display system via wireless communication upon the capturing of the image and almost simultaneously with display on the display unit.

* * * * *